Sept. 15, 1931.  W. L. PAUL  1,823,508
DRAFT ATTACHMENT FOR AGRICULTURAL IMPLEMENTS
Original Filed May 5, 1921  3 Sheets-Sheet 1
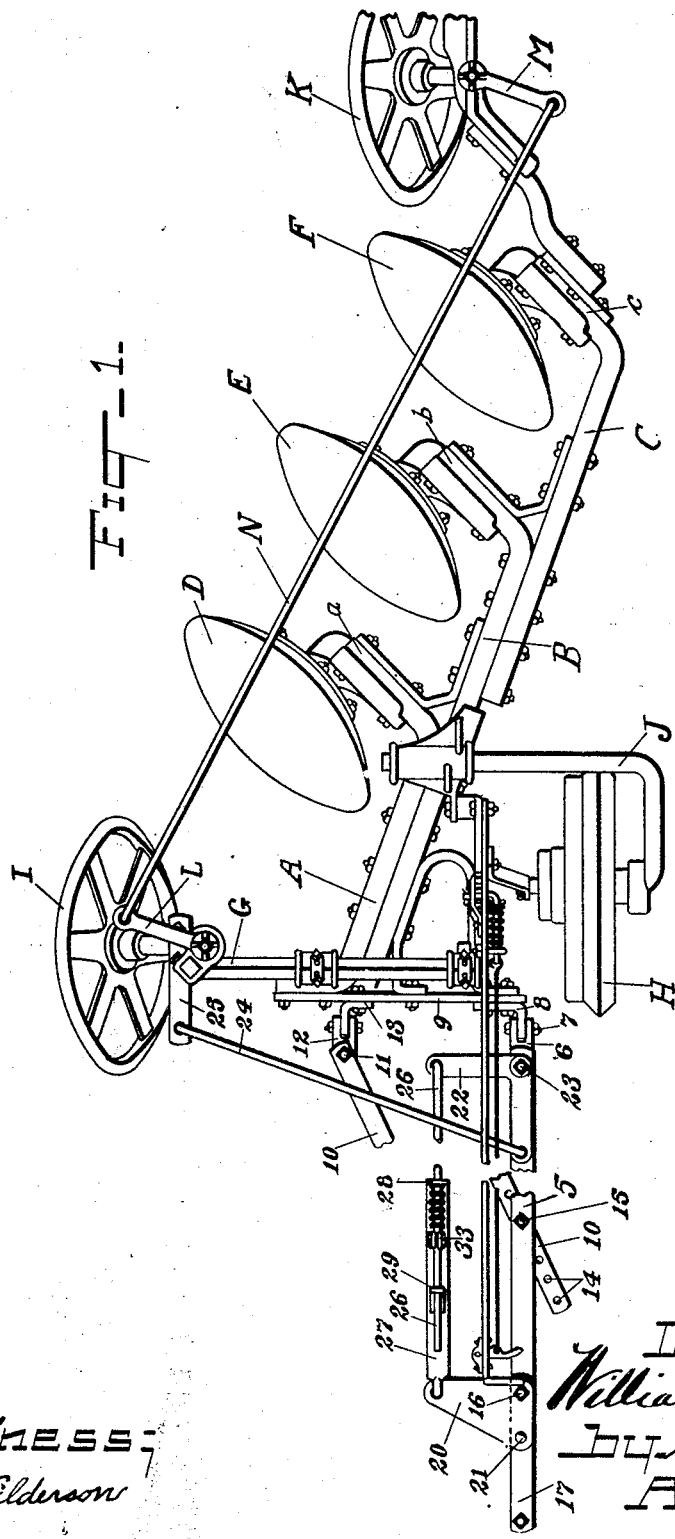

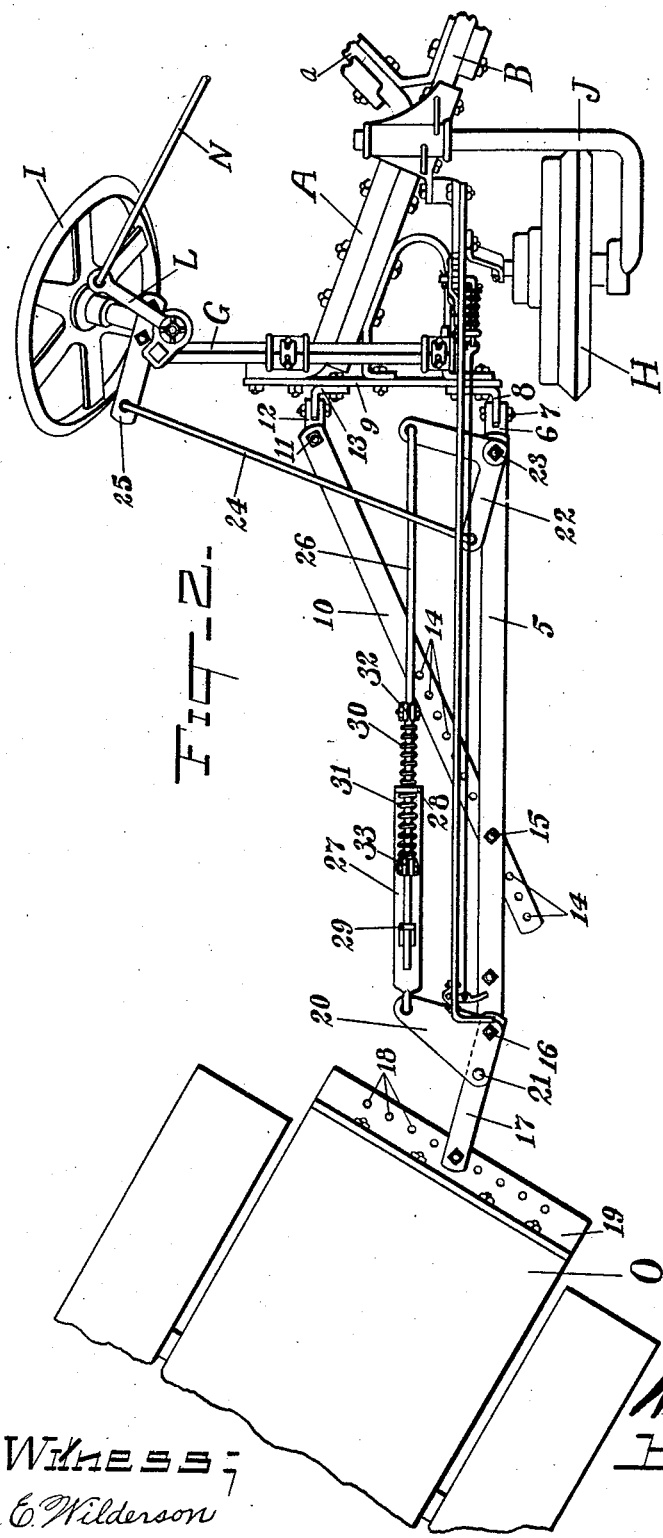

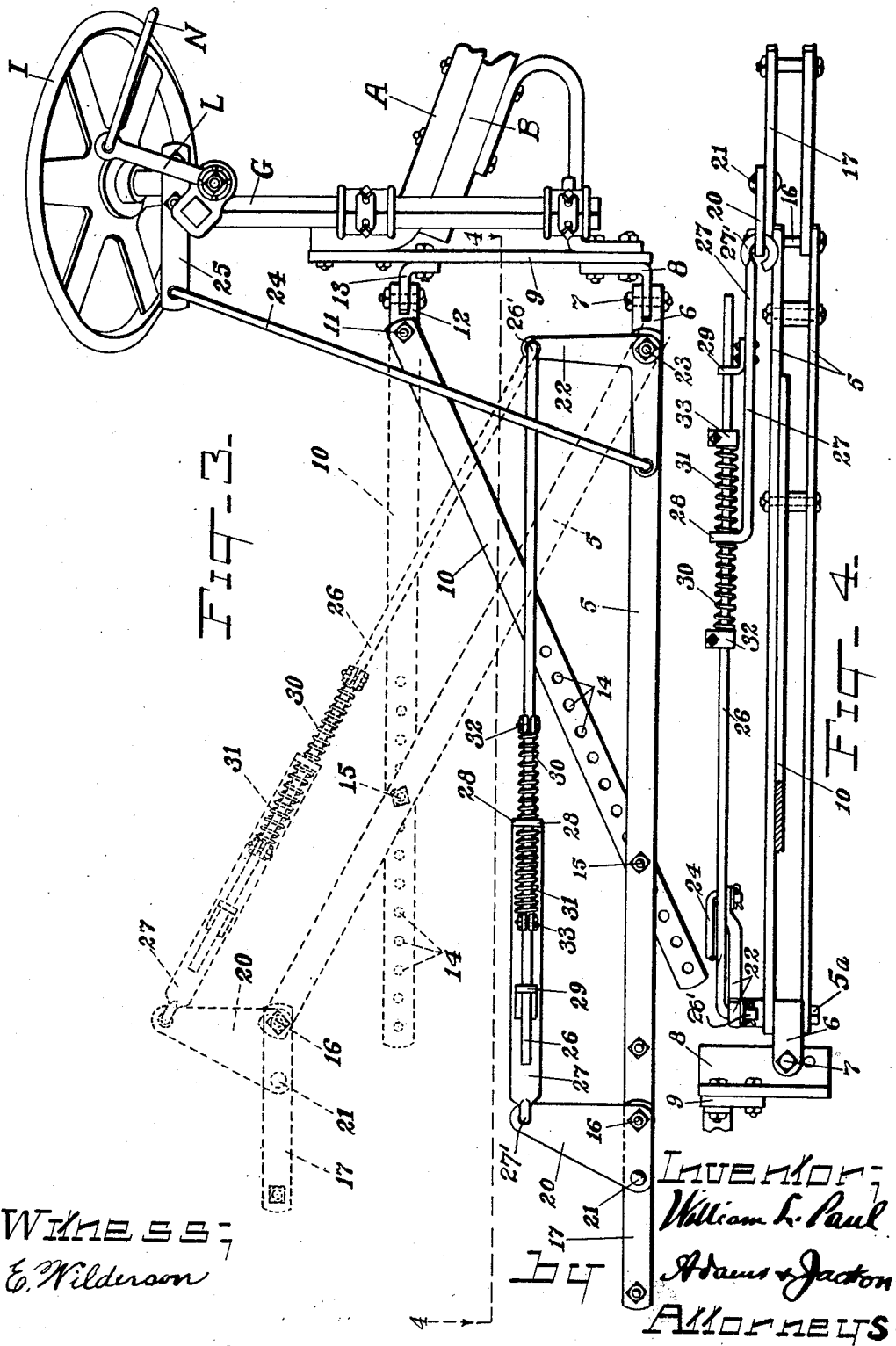

Patented Sept. 15, 1931

1,823,508

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

DRAFT ATTACHMENT FOR AGRICULTURAL IMPLEMENTS

Application filed May 5, 1921, Serial No. 467,107. Renewed October 29, 1926.

This invention relates to an improved hitch mechanism designed primarily for connecting a disc plow to a tractor. As is well understood it is a matter of considerable difficulty to maintain a disc plow in position to travel in a direct line owing to the constant tendency to move laterally that is caused by the inclination of the several discs. The difficulty of maintaining a straightforward movement of the machine is increased, of course, accordingly as the implement is adjusted laterally so as to travel more or less at one side of the longitudinal center of the tractor to which it is attached.

It is one of the objects of my invention to provide a novel rigid hitch device that while pivotally connected with the plow frame so as to permit the usual rising and falling movement is also capable of being laterally adjusted to any required extent to permit the trailing implement to be positioned and held as desired with respect to the longitudinal center of the tractor, and to combine therewith improved steering means for compelling a positive lateral swinging of one or more dirigible supporting wheels of the trailing implement relatively to the implement frame whenever the tractor is turned out of a straight line of travel, so as to cause a corresponding movement of the implement, such steering means, however, being unaffected by any change that may be made in the lateral adjustment of the hitch, and being at all times freely and automatically operable whenever the tractor turns from a straightforward path. Another object of the invention is to so construct the steering mechanism that it shall embody yielding or resilient elements that will act to prevent breakage or damage of parts under various conditions of use to which the tractor and attached implement may be put. I accomplish these principal objects by the parts and combinations of parts shown in the drawings and hereinafter particularly described. That which I believe to be new will be set forth in the claims.

In the drawings,—

Fig. 1 is a plan view, partly broken away, of my improvements connected to a disc plow;

Fig. 2 is a plan view of my improved hitch mechanism and steering devices, a small portion only of the disc plow of Fig. 1 being shown, and the rear end portion of a tractor to which the plow is connected by means embodying my improvements being also shown;

Fig. 3 is a plan view substantially similar to the showing in Fig. 2 but on a larger scale and with the tractor shown in Fig. 2 omitted. the view also showing in dotted lines an adjusted position of the hitch mechanism; and Fig. 4 is a view partly in side elevation and partly in vertical section of the parts shown in Fig. 3,—the section being taken at the line 4—4 of Fig. 3.

Referring to the several figures of the drawings,—A, B and C indicate heavy bars arranged in over-lapping relation, as shown in Fig. 1, and together constituting a diagonally arranged beam of an ordinary disc plow, the several discs that are shown being indicated by D, E and F, each being connected in an ordinary manner to a turned end portion of one of the frame members mentioned, the turned ends being respectively indicated by $a$, $b$ and $c$. G indicates a transverse frame member of the plow at the front end thereof suitably connected to the forward end of the diagonally arranged member composed of the several bars A, B and C. The land and furrow wheels are indicated by H and I, respectively, the land wheel being supported by an axle member J in such manner as to permit of a vertical swinging motion of such wheel relative to the plow frame, whereas the furrow wheel I can be swung laterally for steering purposes, as usual, by reason of the rotatable connection with the frame of the vertical portion of the axle upon which it is mounted. The rear supporting wheel is indicated by K, and, like the wheel I, is capable of being swung laterally with relation to the frame for steering purposes inasmuch as the vertical portion of its axle is also journaled in the frame. Upon the squared upper portion of each of the vertical members of the axles of the dirigible wheels I and K are respectively secured arms L and M, and extending between the outer ends of these arms, that are thus made fast to the vertical portions of the axles of said wheels is a connecting link N by which said wheels are caused to turn laterally in unison. The disc plow thus far briefly described is of ordinary construction, and the description hereinbefore given of its parts will suffice. It will be understood that the plow will be provided with the usual adjusting levers and their segments, but such parts as well as other ordinary features of construction in implements of this kind are not necessary to be described as they form no part of or in any manner affect my invention, which invention has more particularly to do with the means provided at the forward end of the plow for connecting it with a tractor and insuring its being held in the desired position and properly guided during turning movements of the tractor.

Referring now to the connecting and guiding or steering means referred to above, 5 indicates a heavy hitch bar which, in the construction shown, (see Fig. 4) is formed of upper and lower members suitably bolted together and spaced apart in parallel relation. At its rear end this bar is pivotally connected at 5ᵃ to a block 6 that in turn is pivotally connected to the forwardly-projecting member of an angle bar bracket 8 bolted to a transverse bar 9 that is secured in any suitable manner to the forward part of the main frame of the implement. 10 indicates a hitch member in the form of a heavy diagonal bar which cooperates with the hitch bar 5 in forming the draft connection between the implement and the tractor or other draft power. The rear end of this bar 10 is pivotally connected at 11 to a block 12 which is pivotally connected to the forwardly-extending member of an angle iron bracket 13 that, like the similar bracket 8, is bolted to the cross piece 9. In the forward portion of the diagonal bar 10 are formed a plurality of holes 14 through any one of which, and a hole in the bar 5, a bolt 15 is adapted to be inserted and secured, thus securing the two hitch members 5 and 10 rigidly together—the diagonal bar 10, in the construction shown, lying between the two spaced-apart members of the bar 5, as shown in Fig. 4. The pivotal connections of the bars 5 and 10 with their respective blocks are in transverse alinement, and the connections of the blocks with their respective brackets are also in alinement, and hence the bars 5 and 10 when not secured together by the bolt 15 are capable of being turned laterally when it is desired to adjust them for the purpose of shifting laterally the point of application of the draft to the attached implement, and when connected together can also rise and fall as required when passing over uneven ground. The double joint thus provided constitutes, in effect, a universal connection or coupling between the rear end of each of the hitch bars 5 and 10 and the implement. The forward end of the hitch bar 5 is pivotally connected by a bolt 16 to the rear end of a draft member, which in the illustrated construction is in the form of a draft link 17 adapted to be adjustably secured at its forward end in any one of a series of holes 18 in the usual transverse coupling bar 19 with which a tractor is ordinarily provided—the tractor referred to being here indicated generally by the letter O. Said link may, of course, be connected with any other suitable draft means. Extending laterally from the rear portion of the link 17 is an arm 20 which arm is secured fixedly to the link by means of the bolt 16 before referred to, and, in the construction shown, by a rivet 21. A bell-crank lever 22 is pivotally mounted coaxially with the pivotal connection between the rear end of the hitch bar 5 and the frame of the implement. In the illustrated construction said lever is pivoted at 23 to the upper member of the hitch bar 5 and lies at some little distance above such hitch bar member, as clearly shown in Fig. 4. To the forwardly-directed arm of this bell-crank is connected one end of a rod 24 whose other end is connected to the forward end of an arm 25 that projects forward from the vertical portion of the axle of the supporting and steering wheel I, and which is connected to such axle in any secure manner, preferably by being clamped thereto by a U-shaped bolt. Preferably the ends of the rod 24 are respectively connected to the lever 22 and arm 25 by being turned at right angles to pass through holes in such parts and then secured against removal by cotter pins as shown. The other arm of the bell-crank lever 22 is connected with the outer end of the laterally projecting arm 20 by connecting means in the form of a power transmitting device, that at all times remains substantially parallel with the hitch bar 5. Such connecting means, or power transmitting device, in the construction shown is formed of two principal parts movable longitudinally relatively to each other and having interposed between them certain spring members to normally hold them in operative relation to each other and act as buffers or shock absorbers when the power transmitting device is subjected to undue stress. The two principal parts of such power transmitting device as here shown are a rod member 26 and a flat plate-like member 27, the rod member at its rear end being turned to pass through a hole in the end of one of the arms of the bell-crank, such affording a pivot designated 26′, and the forward portion of said rod member overlying the flat or plate member 27 and being held to such member by passing through a hole in the upturned rear end 28 of such member 27, and also passing loosely through a small bracket 29 secured to the upper face of the plate member 27. Such plate member has a hook portion passing through an eye in the outer end of the arm 20, affording a pivot designated 27'. This construction, of course, would permit relative longitudinal movement between the parts 26 and 27, and, therefore, to normally maintain such parts in proper position by means that will yield slightly and act as a buffer or an absorber of shocks as above referred to, I place upon the rod member 26 two stout coiled springs indicated by 30 and 31 respectively, which are located upon opposite sides of the upturned end 28 of the member 27, against which upturned end one end of each of the springs bears, the other ends bearing respectively against fixed collars 32 and 33 on the rod member.

It is to be understood that the above described parts by which the dirigible wheel is steered may be termed "steering means" as a whole and, further, that any one or more of them not otherwise specifically recited is also understood as falling within the meaning of the term as employed in the appended claims.

With the parts as shown in Fig. 1 or in full lines in Fig. 3, and the draft member or link 17 connected with a tractor, it is evident that the pull exerted on the attached implement by the rigid hitch member 5, that is held fixedly by the member 10 in any laterally-adjusted position relatively to the trailing implement, will be such as to compel a straightforward movement of the wheels of the implement, and such straightforward line of movement will continue as long as the tractor continues to move in a straight line. Immediately, however, upon the tractor deviating from a straight line the wheel I will be correspondingly turned laterally to steer the implement in the same direction, such change of movement of the implement being effected by a push or pull applied to the power transmitting device 26, 27 by the arm 20. This necessarily results in a turning of the bell-crank lever 22, and as such bell-crank is connected by the rigid rod 24 with the wheel I in the manner described, such wheel I is turned, and its turning imparts a like movement through the rod N to the rear wheel K. Thus it will be seen that any deviation of the tractor, or other draft power, from a straight line causes a corresponding deviation from such straight forward motion of the implement connected therewith, and that at all times the position of the hitch device relatively to the implement remains unaffected. In other words, the steering means, while supported from the hitch device, is automatically movable to effect a proper guiding of the implement without in any manner affecting the adjustment of the hitch, which device when once set retains the desired relative position between the tractor and the attached implement.

The two members 5 and 10 of the hitch device being connected to the implement at points spaced a considerable distance apart and such two members being securely connected together ensures such a rigid connection as will compel a dragging of the implement in a straight line, and this too, regardless of whether the implement is running directly in rear of the tractor or has been so adjusted as to be considerably at one side or the other of the longitudinal center of the tractor. It is quite important at times to have an adjustment of the implement more or less to one side of such line, and that such adjustment be accomplished without affecting the steering position of the dirigible wheel, as would be the case if the steering means were actuated by lateral adjustment of the hitch device. In other words, the construction should be such that the steering means will remain in statical relation to the dirigible wheel when the hitch device is adjusted laterally to shift the point of application of the draft to the frame. It should be understood, therefore, that the term "statical relation" as used in some of the claims is intended to mean that the lateral adjustment of the hitch device is effected without steering movement of the steering means, and more specifically as applied to the construction illustrated, without endwise movement of the power transmitting device. When such adjustment of the hitch device is to be effected it is accomplished by removing bolt 15 and swinging the member 10 transversely in either direction to engage the bolt with any one of the series of holes 14, thereby shifting the hitch point 16 laterally to a different position, as for example that shown in dotted lines in Fig. 3. The springs 30—31 are to be of such a character and of such strength as to ensure the desired turning of the bell-crank lever and the steering wheel connected therewith whenever a change in the direction of movement of the trailing implement is to be effected in order to properly follow the tractor. Such springs are of value in preventing damage to parts that might be caused during a backing operation of the tractor that would tend to turn the bell-crank lever 22 more than the rod 26 would otherwise permit, and of value also in case of a short turn forward when other parts have not been properly adjusted therefor. It will be noted that whatever adjusted position the hitch device as a whole is caused to assume, the hitch member 5 and the power transmitting device comprising the connection 26—27 will remain in substantial parallelism, since the pivots of the hitch device and the pivots of the power transmitting device are normally in the relation of a parallelogram. For describing this relation, the pivots 5a and 11 may be considered as rear draft pivots for applying draft from the rear end of the hitch device to the frame, and the front pivot 16 may be considered as a front draft pivot for applying draft to the front end of the hitch device. Likewise the pivot 26' corresponds to a rear steering pivot and the pivot 27' a front steering pivot for the power transmitting or steering link device 26—27. It will be observed that the distance from the front steering pivot 27' to the front draft pivot 16 is substantially the same as the distance from the rear steering pivot 26' to one of the aforesaid rear draft pivots. It will also be noted that a line drawn through the steering and draft pivots at the front end of the system is substantially parallel to a line drawn through the steering and draft pivots at the rear end of the system. Hence the four pivots are normally in the relation of a parallelogram, and the connecting members therebetween are in the relation of opposite pairs of parallel links, which remain in this parallel relation in any lateral adjustment of the hitch device. Consequently, such lateral adjustment of the hitch device, as for example that indicated by the dotted line position shown in Figure 3, does not actuate or modify the operation of the steering mechanism, which operates, under the control of the draft means, to hold the dirigible wheel or wheels in normal position when the draft is straight ahead, and to steer such wheel or wheels in response to turning movement of the draft power, wholly unaffected by any lateral shifting of the hitch member to change the position of the implement with relation to the tractor. This is an important feature of my invention, and so far as I am aware is broadly new.

While I have illustrated the link 17 and the arm 20 as the connecting elements between the transverse coupling bar 19 of the tractor and the hitch bar 5 and power transmitting device or connecting means 26—27, the hitch bar and connecting means, if preferred, may be attached directly to the usual transverse coupling bar of a tractor at points spaced the same distance apart as the rear ends of said hitch bar and connecting means, so that their parallel relation to each other is always maintained, notwithstanding lateral adjustment of said hitch bar in the manner described; therefore the arm 20 for all practical purposes may be considered as equivalent to the tractor transverse coupling bar 19, because it is the angulation of this arm 20 relatively to the wheel frame that actuates the connecting means to steer the dirigible wheels.

The term "tractor" as used in the claims is to be understood as comprehending any suitable draft means, whether it be a self-propelled motor vehicle of any description, draft animals, or other draft force.

What I claim as my invention and desire to secure by Letters Patent, is—

1. The combination with a wheeled frame comprising a dirigible wheel, of draft means, a hitch member in the form of a bar pivotally connected with said draft means and with said frame to swing laterally, means for holding said bar in its different positions of adjustment, and steering means for steering said dirigible wheel by lateral inclination of the line of draft, comprising a power transmitting device connected at its forward end with said draft means, a rocking member pivoted coaxially with the pivotal connection of said hitch member with said frame, and connected with the rear end portion of said power transmitting device, and means connecting said rocking member with said dirigible wheel.

2. The combination with a wheeled frame comprising a dirigible wheel, of draft means, a hitch member in the form of a bar pivotally connected with said draft means and with said frame to swing laterally, means for holding said bar in its different positions of adjustment, and steering means for steering said dirigible wheel by lateral inclination of the line of draft, comprising a power transmitting device connected at its forward end with said draft means in substantial parallelism with said hitch member, and a bell-crank lever pivoted coaxially with the pivot connecting said hitch device with the frame, one of the arms of said lever being connected with said power transmitting device, and the other arm thereof being connected with said dirigible wheel.

3. The combination with a wheeled frame comprising a dirigible wheel, of draft means, a hitch member in the form of a vertically swinging bar pivotally connected with said draft means and adjustable to shift its forward end laterally relatively to said frame, means for holding said bar in its different positions of adjustment, and steering means for steering said dirigible wheel by lateral inclination of the line of draft, comprising a power transmitting device connected at its forward end with said draft means, and a bell-crank lever pivoted coaxially with the pivot connecting said hitch device with the frame, one of the arms of said lever being connected with said power transmitting device, and the other arm thereof being connected with said dirigible wheel.

4. The combination with a wheeled frame, of a rigid hitch device pivotally connected at its rear end with said frame to permit it to be turned to move its front end to different lateral positions, means for securing said device in any of its laterally-adjusted positions, a link pivotally connected with the forward end of the hitch device and adapted to be also pivotally connected with a tractor, and steering means comprising a member pivotally mounted on said hitch device and means connecting it respectively with said link and with one of the wheels of said frame.

5. The combination with a wheeled frame, one of the wheels of which is dirigible, of a tractor-hitch device comprising two rigid members spaced apart at their rear ends, such ends being pivotally connected with said frame to swing laterally and the forward portions of said members intersecting and being connected together, one of said members being provided with means for permitting the hitch device to be adjusted to shift the hitch point laterally relatively to said frame, means for pivotally connecting said hitch device with a tractor, and steering means comprising a rocking member pivotally mounted coaxially with the pivot of one of said rigid members, and connected with both the said dirigible wheel and the tractor-attaching means whereby the direction of movement of the wheeled frame is controlled automatically by lateral turning of the tractor with respect to the hitch device.

6. The combination with a wheeled frame, one of the wheels of which is dirigible, of a tractor-hitch device comprising two rigid members each pivotally connected with said frame, one of said members inclining forwardly toward the other, means for adjustably connecting said two members together, a draft element pivoted to the forward end of the hitch device and adapted to be connected to a tractor, and means connecting said draft element with said dirigible wheel for controlling the direction of movement of the wheeled frame, such connecting means including a bell-crank lever pivotally connected with the hitch member, a rod connecting one arm of said bell-crank lever with said wheel, and another rod connected at one end with the other arm of the bell-crank lever, the latter rod being connected with said draft element.

7. The combination with a wheeled frame, one of the wheels of which is dirigible, of a tractor-hitch device comprising two rigid members spaced apart at their rear ends, such ends being pivotally connected with said frame and the forward portions of said members being adjustably connected together, means for connecting the forward end of said hitch device with a tractor, and steering means comprising a bell-crank lever pivotally connected with one member of the hitch device, a rod connecting one arm of said lever with said dirigible wheel, and a connection interposed between the other arm of the lever and the said means for connecting the hitch device with the tractor, said connection being movable endwise by lateral deflection of the line of draft, and lying at all times substantially parallel with one member of the said hitch device.

8. The combination with a wheeled frame, one fo the wheels of which is dirigible, of a tractor-hitch device comprising two rigid members spaced apart at their rear ends, such ends being pivotally connected with said frame and the forward portions of said members being adjustably connected together, means for connecting the forward end of said hitch device with a tractor, and steering means comprising a bell-crank lever pivotally connected with one member of the hitch device, a rod connecting one arm of said lever with said dirigible wheel, and a longitudinally-yieldable connection interposed between the other arm of the lever and the said means for connecting the hitch device with the tractor, said connection being movable endwise by lateral deflection of the line of draft, and lying at all times substantially parallel with one member of the said hitch device.

9. The combination with a wheeled frame, one of the wheels of which is dirigible, of a tractor-hitch device comprising two rigid members spaced apart at their rear ends, such ends being pivotally connected with said frame and the forward portions of such members being connected together, a link pivotally connected to the forward end of one of said members and adapted to be connected with a tractor, an arm secured to and projecting laterally from said link, a bell-crank lever pivotally connected with said last-named member of the hitch device, a rod connecting one arm of said lever with said wheel, and a connection lying substantially parallel with said last-named member of the hitch device and connecting the other arm of said lever with the projecting arm on said link.

10. The combination with a wheeled frame, one of the wheels of which is dirigible, of a tractor-hitch device comprising two rigid members spaced apart at their rear ends, such ends being pivotally connected with said frame and the forward portions of such members being connected together, a link pivotally connected to the forward end of one of said members and adapted to be connected with a tractor, an arm secured to and projecting laterally from said link, a bell-crank lever pivotally connected with said last-named member of the hitch device, a rod connecting one arm of said lever with said wheel, and a connection lying substantially parallel with said last-named member of the hitch device and connecting the other arm of said lever with the projecting arm on said link, said connection being a divided one and provided between the parts thereof with spring means.

11. The combination with a wheeled frame, one of the wheels of which is dirigible, of a rigid hitch member pivotally connected at its rear end with said frame, and adapted to be connected at its front end with a tractor to turn laterally into different adjusted positions, means for holding it in said different adjusted positions, and steering mechanism comprising an element pivotally mounted on said hitch member, means connecting said element with said dirigible wheel, a rod pivotally connected at its rear end with the said pivoted element on the hitch member, and draft means pivotally connected with the forward end of said rod and operating to hold the same at all times approximately parallel with said hitch member, and to move said rod endwise upon lateral variation of the line of draft.

12. The combination with a wheeled frame, one of the wheels of which is dirigible, of a rigid hitch member pivotally connected at its rear end with said frame, a link pivotally connected with the forward end of said hitch member, said link being adapted to be pivoted to a tractor, means for holding said hitch member in line with or at an angle to the frame, and steering mechanism comprising an element pivotally mounted on said hitch member, means connecting said element with said dirigible wheel, and a rod pivotally connected at its forward end with said link at one side of the pivotal connection of the forward end of said hitch member and at its rear end pivotally connected with the said pivoted element on the hitch member at one side of the point of connection of said element with the hitch member, whereby said rod and hitch member are at all times held spaced apart.

13. The combination with a wheeled frame comprising a dirigible wheel, of a hitch member in the form of a bar pivotally connected with said frame to swing laterally, means for holding said hitch member in its different positions of lateral adjustment, a draft member pivotally connected with the forward portion of said bar and adapted to be connected with suitable draft means, said draft member having a laterally projecting arm, a bell crank pivoted coaxially with said bar and having an arm projecting laterally in substantial parallelism with the arm of said draft member, a steering member connected with said arms and held thereby in substantial parallelism with said bar, and means connecting the other arm of said bell crank with said dirigible wheel.

14. The combination with a wheeled vehicle adapted to be propelled by a tractor and comprising a frame and a dirigible wheel, a rigid hitch device connected with said frame to swing laterally and adapted to be connected at its forward end with a tractor, and means for holding said hitch device against lateral swinging, of a member mounted on the vehicle to rock about a substantially vertical axis, a steering connection between said rocking member and the dirigible wheel, for steering said wheel, and means for actuating said rocking member by the turning of the tractor relatively to the hitch device, and for holding said rocking member against rocking when the draft is straight ahead.

15. The combination with a wheeled vehicle adapted to be propelled by a tractor and comprising a frame and a dirigible wheel, and a hitch device connected with said frame including a hitch member adjustable to shift laterally the point of application of the draft thereto, said hitch device being adapted to be connected at its forward end with a tractor, of a rocking member mounted on the vehicle, a connection between said rocking member and the dirigible wheel, for steering said wheel, and steering means connected with said rocking member and constantly supported in substantial parallelism with said hitch member in the different positions of lateral adjustment of the latter, and adapted to be actuated by the turning of the tractor relatively to the hitch device to actuate said rocking member to steer the dirigible wheel.

16. The combination with a wheeled frame comprising a dirigible wheel, a hitch device connected with said frame, including a hitch member adjustable to shift laterally the point of application of the draft thereto, and a draft connection adapted to connect said hitch device at its forward end with a tractor, of a rocking member connected with said frame, a steering connection between said rocking member and the dirigible wheel, for steering said wheel, and a power transmitting device comprising spring cushioned endwise movable member connected respectively with said rocking member and with said draft connection in substantial parallelism with said hitch member and actuated by turning movement of the tractor relatively to the hitch device, to rock said rocking member to steer the dirigible wheel.

17. The combination with a wheeled vehicle comprising a frame and a dirigible wheel, a hitch device connected with said frame and adjustable to shift laterally the point of application of the draft thereto, a draft member pivotally connected with said hitch device and adapted to be connected with a tractor, and means for holding said hitch device in its different positions of adjustment, of a rocking member on the vehicle, a steering connection between said rocking member and the dirigible wheel, for steering said wheel by the rocking thereof, and steering means connected with said draft member and with said rocking member, and through such connections being shiftable laterally with said hitch device in substantial parallelism therewith, said steering means operating in the different adjusted positions of the hitch device to hold said dirigible wheel in its normal position when the draft is straight ahead, and to turn said wheel laterally when the line of draft is inclined laterally.

18. The combination with a wheeled vehicle comprising a frame and a dirigible wheel, a hitch device pivotally connected with said frame to swing vertically, including a hitch member adjustable to shift laterally the point of application of the draft thereto a draft member pivotally connected with said hitch device and adapted to be connected with a tractor, and means for holding said hitch member in its different positions of adjustment, of a rocking member on the vehicle, a steering connection between said rocking member and the dirigible wheel, for steering said wheel, and a power transmitting device connected with said draft member and with said rocking member.

19. The combination with a wheeled vehicle comprising a frame and a dirigible wheel, a hitch device connected with said frame, including a hitch member adjustable to shift laterally the point of application of the draft thereto, means for holding said hitch member in its different positions of adjustment, and a draft member pivoted to rock laterally relatively to said hitch device for applying draft power thereto, of a rocking member on the vehicle, a steering connection between said rocking member and the dirigible wheel, for steering said wheel, and a power transmitting device interposed between said draft member and said rocking member.

20. The combination with a wheeled vehicle comprising a frame and a dirigible wheel, a hitch device pivotally connected with said frame to swing vertically, including a hitch member adjustable to shift laterally the point of application of the draft thereto, means for holding said hitch member in its different positions of adjustment, and a draft member pivoted to rock laterally relatively to said hitch member, for applying draft power thereto, of a rocking member on the vehicle, a steering connection between said rocking member and the dirigible wheel, for steering said wheel, and a power transmitting device interposed between said draft member and said rocking member.

21. The combination with a wheeled frame comprising a dirigible wheel, a rigid hitch device connected with said frame and adjustable laterally at its forward end, and a draft connection pivotally connected with the forward end of said hitch device and having a laterally extended rigid arm, of a rocking member mounted to rock about a vertical axis and connected with said frame, arms on said rocking member, a connection between one of said arms and said dirigible wheel, for steering said wheel by the rocking of said rocking member, and a power transmitting device comprising spring cushioned endwise movable members connecting the other of said arms with the laterally extending arm of said draft connection.

22. The combination with a wheeled frame comprising a dirigible wheel, a rigid hitch device connected with said frame, and a laterally extending draft connection at the forward end of said hitch device for connecting the same with a tractor, of a rocking member connected with said frame, a steering connection between said rocking member and the dirigible wheel, for steering said wheel, and a power transmitting device between said draft connection and said rocking member, comprising telescopically associated members and resilient means interposed between said telescoping members, for rocking said rocking member by lateral deflection of the line of draft.

23. The combination with a wheeled vehicle comprising a frame and a dirigible wheel, a hitch member connected with said frame to swing laterally, to shift laterally the point of application of the draft to the frame, and means for holding said hitch member in different relative laterally adjusted positions, of a rocking member on the vehicle, a steering connection between said rocking member and the dirigible wheel, for steering said wheel, a power transmitting device connected with said rocking member, and means for causing said power transmitting device to be actuated by change of direction of the line of draft to rock said rocking member, and to cause said power transmitting device to swing laterally with said hitch member in statical relation to said dirigible wheel.

24. The combination with a wheeled frame comprising a dirigible wheel, a hitch device comprising a rigid hitch member pivotally connected with the frame to swing laterally, means for holding said hitch member in its different positions of adjustment, and a laterally swinging link for connecting said hitch device with a tractor, said link having a rigid arm projecting laterally therefrom, of a rocking member connected with the frame and having arms, means connecting one of said arms with said dirigible wheel, for steering said wheel, and means connecting the other arm with said rigid arm, for actuating said rocking member by lateral deflection of the line of draft.

25. The combination with a wheeled frame comprising a dirigible wheel, a hitch device comprising a rigid hitch member pivotally connected with the frame to swing laterally, means for holding said hitch member in its different positions of adjustment, and means adapted to pivotally connect said hitch device with a tractor, said means having a lateral extension, of a rocking member connected with said frame and adapted to rock about a substantially vertical axis and having arms in angular relation to each other, a connection between one of said arms and said dirigible wheel, for steering said wheel, and a connection between the other arm and said lateral extension for actuating said rocking member by change of direction of the line of draft.

26. The combination with a wheeled frame, one of the wheels of which is dirigible, of a rigid hitch member pivotally connected at its rear end with said frame to turn laterally into different adjusted positions, and adapted to be connected at its front end with a tractor, means for holding it in said different adjusted positions, and steering mechanism comprising an element pivotally mounted on said hitch member, means connecting said element with said dirigible wheel, a rod pivotally connected at its rear end with the said pivoted element on the hitch member, and means pivotally connected with the forward end of said rod and with the hitch member and operating to hold said rod at all times approximately parallel with said hitch member, and to move said rod endwise upon lateral deflection of the line of draft.

27. The combination with a wheeled frame comprising a dirigible wheel, of a hitch member connected with said frame and adapted to be connected with a tractor, said hitch member being adjustable to shift laterally the point of application of the draft to said frame, and steering means operatively connected with said dirigible wheel, said steering means including a power transmitting device and means supporting said power transmitting device constantly in substantial parallelism with said hitch member, for movement with said hitch member, in statical relation to said dirigible wheel, when said hitch member is adjusted laterally.

28. The combination with a wheeled frame comprising a dirigible wheel, of a hitch member connected with said frame and adapted to be connected with a tractor, said hitch member being adjustable to shift laterally the point of application of the draft to said frame, and steering means operatively connected with said dirigible wheel, said steering means comprising a power transmitting device, and means supporting said power transmitting device constantly in substantial parallelism with said hitch member, for movement with said hitch member, in statical relation to said dirigible wheel, when said hitch member is adjusted laterally, said supporting means comprising means operatively connected with said dirigible wheel to steer the same by endwise movement of said power transmitting device.

29. The combination with a wheeled frame adapted to be propelled by a tractor and comprising a dirigible wheel, of a hitch member connected with said frame and adapted to be connected with a tractor, said hitch member being pivotally connected with the frame to swing laterally and vertically, means for holding said hitch member in its different positions of lateral adjustment, and steering means operatively connected with said dirigible wheel, said steering means including a power transmitting device, and means for supporting said power transmitting device constantly in substantial parallelism with said hitch member, for movement with said hitch member, in statical relation to said dirigible wheel, when said hitch member is adjusted laterally, said supporting means including means for actuating said power transmitting device by the turning of the tractor relatively to said hitch member.

30. The combination with a wheeled frame comprising a dirigible wheel, of a hitch member connected with said frame and adapted to be connected with a tractor, said hitch member being adjustable to shift laterally the point of application of the draft to said frame, and steering means operatively connected with said dirigible wheel, said steering means comprising an endwise movable power transmitting device, means connecting said device with the dirigible wheel whereby the power transmitting device is movable to steer said dirigible wheel, and means supporting said power transmitting device constantly in substantial parallelism with said hitch member in all positions thereof, and operating to move said power transmitting device laterally in statical relation to said dirigible wheel, when said hitch member is adjusted laterally, said supporting means comprising means for moving said power transmitting device endwise by the turning of the tractor relatively to said hitch member.

31. The combination with a wheeled frame comprising a dirigible wheel, of a hitch member connected with said frame and adapted to be connected with a tractor, said hitch member being adjustable to shift laterally the point of application of the draft to said frame, and steering means operatively connected with said dirigible wheel, said steering means comprising a power transmitting device movable endwise to steer said dirigible wheel, said power transmitting device being composed of spring cushioned members movable endwise with respect to each other, an operating connection by which steering movement of the dirigible wheel is accomplished by movement of said power transmitting device, and means supporting said power transmitting device constantly in substantial parallelism with said hitch member in all positions thereof, and operating to move said power transmitting device laterally in statical relation to said dirigible wheel, when said hitch member is adjusted laterally, said supporting means comprising means for moving said power transmitting device endwise by the turning of the tractor relatively to said hitch member.

32. The combination with a wheeled frame comprising a dirigible wheel, of a hitch member connected with said frame and adapted to be connected with a tractor, said hitch member being adjustable to shift laterally the point of application of the draft to said frame, steering means operatively connected with said dirigible wheel and mounted to move laterally with said hitch member, in statical relation to said dirigible wheel, when said hitch member is adjusted laterally, and means adapted to connect said steering means with the tractor and serving to hold said steering means against steering movement when the draft is straight ahead, and to actuate said steering means to steer said dirigible wheel when the line of draft is deflected laterally.

33. The combination with a wheeled frame comprising a dirigible wheel, of a hitch member connected with said frame and adapted to be connected with a tractor, said hitch member being adjustable to shift laterally the point of application of the draft to said frame, steering means operatively connected with said dirigible wheel and mounted to move laterally with said hitch member, in statical relation to said dirigible wheel, when said hitch member is adjusted laterally, and means pivotally connected with said steering means and with said hitch member, for connecting the same with the tractor, said means including a system of parallel links adapted to hold said steering means against steering movement when the draft is straight ahead, and to actuate said steering means to steer said dirigible wheel when the line of draft is deflected laterally.

34. The combination with a wheeled frame comprising a dirigible wheel, of a hitch member connected with said frame and adapted to be connected with a tractor, said hitch member being adjustable to shift laterally the point of application of the draft to said frame, steering means comprising an endwise movable member, and means connecting the latter member rearwardly with said hitch member and with said wheel, and operable by endwise movement of said endwise movable member to steer said wheel, and means adapted to connect said endwise movable member with the tractor and serving to hold said endwise movable member against endwise movement in all shifted positions of the point of application of the draft to said frame when the draft is straight ahead, and to move the same endwise to steer said wheel when the line of draft is deflected laterally.

35. The combination with a wheeled frame comprising a dirigible wheel, of a hitch member connected with said frame and adapted to be connected with a tractor, said hitch member being adjustable to shift laterally the point of application of the draft to said frame, steering means comprising an endwise movable member, and means connecting the latter member rearwardly with said hitch member and with said wheel, and operable by endwise movement of said endwise movable member to steer said wheel, and a draft member pivotally connected with the forward portions of said hitch member and said endwise movable member, said draft member cooperating with the means connecting the endwise movable member with the hitch member to hold said hitch member and endwise movable member constantly in substantial parallelism with each other, said draft member being adapted to be connected with the tractor.

36. The combination with a wheeled frame comprising a dirigible wheel, of a hitch member connected with said frame and adapted to be adjusted to shift laterally the point of application of the draft to said frame, a draft member pivotally connected with said hitch member to swing laterally and adapted to be connected with a tractor, steering means comprising an endwise movable member connected at the front with said draft member to be moved endwise by lateral swinging thereof, means connecting said endwise movable member at the rear with said hitch member and cooperating with said draft member to maintain said endwise movable member constantly in substantial parallelism with said hitch member, and means for steering said dirigible wheel by endwise movement of said endwise movable member.

37. The combination with a wheeled frame comprising a dirigible wheel, of a hitch member connected with said frame and adapted to be adjusted to shift laterally the point of application of the draft to said frame, a draft member pivotally connected with the forward portion of the hitch member to swing laterally and adapted to be connected with a tractor, and steering means comprising an endwise movable member connected at the front with said draft member to be moved endwise by lateral movement thereof, a rocking member connected with the frame, and means operatively connecting said rocking member with the dirigible wheel for steering the same, said endwise movable member being connected at the rear with said rocking member in constant substantial parallel relation to said hitch member for actuating said rocking member by endwise movement of said endwise movable member.

38. The combination with a wheeled frame comprising a dirigible wheel, a hitch member in the form of a bar pivotally connected with the frame to swing laterally, means for holding the bar in its different positions of adjustment, and steering means for steering the dirigible wheel by lateral inclination of the line of draft, comprising a power transmitting device controlled by the lateral inclination of the line of draft, a rocking member pivoted coaxially with the pivotal connection of the hitch member with the frame, and connected with the rear end portion of the power transmitting device, and means connecting the rocking member with the dirigible wheel.

39. The combination with a wheeled vehicle comprising a frame and a dirigible wheel, of a hitch member pivotally connected at its rear end with the frame by a rear draft pivot and adapted to be connected at its front end with a tractor, said hitch member being adjustable to shift laterally the point of application of the draft to said frame, steering means comprising an endwise movable link device, means supporting the rear end of said link device and connected therewith by a rear steering link pivot and operatively connected with said dirigible wheel to steer the latter by endwise movement of said link, and means for connecting the front end of said hitch member with the tractor by a front draft pivot and for supporting the front end of said steering link device by a front steering link pivot, said pivots being arranged whereby in substantially all laterally adjusted positions of said hitch member a line extended between said front draft and steering link pivots is substantially parallel to a line extended between said rear draft and steering link pivots.

40. The combination with a wheeled vehicle comprising a frame and a dirigible wheel, of a hitch device pivotally connected with the frame by a rear draft pivot, said hitch device being adjustable to shift laterally the point of application of the draft to said frame, steering means comprising an endwise movable link device, means pivotally connected with the rear end of said link device by a rear steering link pivot and operatively connected with said dirigible wheel to steer the latter by endwise movement of said link device, and means for connecting the front end of said hitch device with the tractor by a front draft pivot and for supporting the front end of said steering link device by a front steering link pivot, said pivots being arranged whereby in different laterally adjusted positions of said hitch device a line extended between said front draft pivot and front steering link pivot is substantially parallel to a line extended between said rear draft pivot and said rear steering link pivot, and whereby the distance between said front pivots remains substantially the same as the distance between said rear pivots.

41. The combination with a wheeled vehicle comprising a frame and a dirigible wheel, of a hitch device pivotally connected with the frame by a rear draft pivot, said hitch device being adjustable to shift laterally the point of application of the draft to said frame, steering means comprising an endwise movable link device, means pivotally connected with the rear end of said link device by a rear steering link pivot and operatively connected with said dirigible wheel to steer the latter by endwise movement of said link device, and a draft member adapted to be connected with a tractor and pivotally connected with said hitch device by a front draft pivot and pivotally connected with said link device by a front steering link pivot, said pivots being arranged whereby in different laterally adjusted positions of said hitch device a line extended between said front draft and steering link pivots is substantially parallel to a line extended between said rear draft and steering link pivots, and whereby the distance between said rear pivots remains substantially the same as the distance between said front pivots.

42. The combination with a wheeled vehicle comprising a frame and a dirigible wheel, a draw element, a rigid hitch device pivotally connected between the frame and draw element, means for holding said hitch device against lateral swinging, of steering means including a power transmitting device operatively connected to said wheel and to said draw element and being of substantially the same length and positioned parallel to said hitch device.

43. The combination with a wheeled frame comprising a dirigible wheel, of a draft link, means for pivotally connecting the link with the frame in a number of laterally adjusted positions relative to the frame, and means constantly connected with the draft link and the dirigible wheel and adapted to maintain the dirigible wheel parallel with the link as the link is rotated about its pivot, said means including a part which remains substantially stationary as said link is adjusted laterally.

44. The combination with a wheeled frame comprising a dirigible wheel, of a pivoted draft link, means connecting the link with the frame in a number of laterally adjusted positions relative to the frame to adjust the hitch point laterally of the frame, and link means connecting the dirigible wheel and the pivoted draft link so that as the link pivots the dirigible wheel is angled a corresponding amount, said link means including parts which retain a fixed position relative to said wheel when the draft link is shifted laterally to adjust said hitch point.

WILLIAM L. PAUL.